United States Patent Office 3,136,741
Patented June 9, 1964

3,136,741
PROCESS FOR THE PRODUCTION OF POLYCARBONATES
Hermann Schnell, Ludwig Bottenbruch, Heinrich Krimm, and Gerhard Fritz, Krefeld, Germany, assignors to Farbenfabriken Bayer Aktiengesellschaft, Leverkusen, Germany, a corporation of Germany
No Drawing. Filed Mar. 21, 1956, Ser. No. 572,802
Claims priority, application Germany Mar. 26, 1955
6 Claims. (Cl. 260—47)

A new kind of useful thermoplastic material has been obtained according to the proposal to convert di-monohydroxyarylene alkanes by reaction with phosgene, with bis-chloroformates of such dihydroxy compounds, or with diesters of carbonic acid, into high molecular polycarbonates (application Ser. No. 461,938, filed Oct. 12, 1954 and Ser. No. 557,256, filed Jan. 4, 1956).

It has now been found that similar thermoplastic materials with varied properties desirable for a number of purposes are obtained by polycondensing into polycarbonates of the aforesaid type besides di-monohydroxyarylene alkanes furthermore alkyl, cycloalkyl or other aryl dihydroxy compounds.

The so produced mixed polycarbonates contain the residues of di-monohydroxyarylene alkanes of the formula:

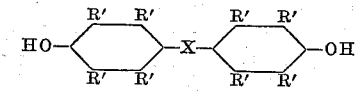

wherein X is selected from the group consisting of

and

each R being selected from the group consisting of hydrogen, unbranched and branched monovalent aliphatic hydrocarbon residues up to 10 carbon atoms, monovalent cycloaliphatic residues, monovalent araliphatic hydrocarbon residues having up to 4 carbon atoms as side-chains, the phenyl and the furyl residue, Z representing the carbon and hydrogen atoms completing a cycloaliphatic ring, and each R' representing a member of the group consisting of hydrogen, monovalent unbranched and branched aliphatic hydrocarbon residues up to 5 carbon atoms, monovalent cycloaliphatic and aromatic hydrocarbon residues, together with the residues of other dihydroxy compounds.

They possess e.g. a lesser tendency to crystallise than the simple polycarbonates and are therefore especially suitable for casting thicker, clearer films and for the production of larger mouldings. The new polycarbonates are also distinguished generally by a better solubility in many organic solvents which render possible their application in the fields of lacquers and emulsions. They can frequently be orientated by stretching whereby the mechanical and elastic properties and the fastness to chemical agents are improved.

Thus, for instance, a mixed polycarbonate produced from 80 mol percent of 2,2-(4,4'-dihydroxy-diphenylene)-propane and 20 mol percent resorcinol is an elastic thermoplastic material softening at 230–250° C., quite soluble inter alia in aromatic hydrocarbons, and no longer having any tendency to crystallise during working up from solutions or in thermoplastic moulding treatment. With a mixing ratio of 90 mol percent 2,2-(4,4'-dihydroxy-diphenylene)-propane and 10 mol percent of 2,6-dihydroxy-naphthalene, one obtains, e.g. a polycarbonate having a softening point of about 290° C. By raising the proportion of 2,6-dihydroxy-naphthalene to 20 mol percent the melting point is raised to over 300° C. A polycarbonate with a content of 50 mol percent of 2,2-(4,4'-dihydroxy-dicyclohexylene)-propane has, in contrast to the polycarbonate made from pure dihydroxy-diphenylene propane, a somewhat higher softening point accompanied by significantly improved solubility properties, especially in aromatic hydrocarbons and esters. The tear resistance of films produced from such mixed polycarbonates lies about 20% higher than that of films produced from 2,2-(4,4'-dihydroxy-diphenylene)-propane alone.

As examples for di-monohydroxyarylene alkanes there may be named for instance:

4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
1,1-(4,4'-dihydroxy-diphenylene)-1-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-α-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane (melting point 149–150° C.),
2,2-(4,4'-dihydroxy-diphenylene)-4-methyl-pentane,
2,2-(4,4'-dihydroxy-diphenylene)-heptane (boiling point 198–200° C. under 0.3 mms. mercury gauge),
2,2-(4,4'-dihydroxy-diphenylene)-octane,
2,2-(4,4'-dihydroxy-diphenylene)-nonane (melting point 68° C.),
1,1-(4,4'-dihydroxy-diphenylene)-1-phenyl-ethane,
(4,4'-dihydroxy-diphenylene)-1-(α-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-dekahydronaphthalene (melting point 181°),
2,2-(4,4'-dihydroxy-3,3'-dicyclohexyl-diphenylene)-propane (melting point 144–146° C.),
2,2-(4,4'-dihydroxy-3-methyl-diphenylene)-propane (melting point 114° C.),
2,2-(4,4'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane,
1,1-(4,4'-dihydroxy-3,3'-dimethyl-6,6'-dibutyl-diphenylene)-butane,
1,1-(4,4'-dihydroxy-3,3'-dimethyl-6,6'-di-tert-butyldiphenylene)-ethane,
1,1-(4,4'-dihydroxy-3,3'-dimethyl-6,6'-di-tert.butyl-diphenylene)-propane,
1,1-(4,4'-dihydroxy-3,3'-dimethyl-6,6'-di-tert.butyl-diphenylene)-butane,
1,1-(4,4'-dihydroxy-3,3'-dimethyl-6,6'-di-tert.butyl-diphenylene)-isobutane, 1,1-(4,4'-dihydroxy-3,3'-dimethyl-6,6'-di-tert.butyl-diphenylene)-heptane,
1,1-(4,4'-dihydroxy-3,3'-dimethyl-6,6'-di-tert.butyl-diphenylene)-1-phenyl-methane,
1,1-(4,4'-dihydroxy-3,3'-dimethyl-6,6'-di-tert.butyl-diphenylene)-2-methyl-2-pentane,
1,1-(4,4'-dihydroxy-3,3'-dimethyl-6,6'-di-tert.butyl-diphenylene)-2-ethyl-2-hexane, and
1,1-(4,4'-dihydroxy-3,3'-dimethyl-6,6'-di-tert.amyl-diphenylene)-butane.

As examples of the accompanying dihydroxy compounds which may be used according to the invention, the following are named by way of example: aliphatic dihydroxy compounds such as: ethylene glycol, diethylene glycol, triethylene glycol, polyethylene glycol, thiodiglycol, ethylene dithiodiglycol, the di-, and polyglycols produced from propyleneoxide-1,2, o, m, or p-xylylene glycol, propanediol-1,3, butanediol-1,3, butanediol-1, 4, 2-methylpropanediol-1,3, pentanediol-1,5, 2-ethylpropanediol-1,3, hexanediol-1,6, octanediol-1,8, 1-ethylhexanediol-1,3, and decanediol - 1,10, cycloaliphatic dihydroxy compounds such as cyclohexanediol-1,4 cyclohexanediol-1,2, 2,2-(4, 4' - dihydroxy - dicyclohexylene)-propane and 2,6-dihydroxydecahydronaphthalene and aromatic dihydroxy compounds such as hydroquinone, resorcinol, pyrocatechol, 4,4'-dihydroxydiphenyl, 2,2'-dihydroxydiphenyl, 1,4-dihydroxynaphthalene, 1,6 - dihydroxynaphthalene, 2,6-dihydroxynaphthalene, 1,2-dihydroxynaphthalene, 1,5-dihydroxynaphthalene, dihydroxyanthracene, 2,2' - dihydroxydinaphthyl-1,1' and o, m, p-hydroxybenzylalcohol.

The new mixed polycarbonates can be produced in the same way as the simple polycarbonates, that is to say: mixtures of the aforesaid di-monohydroxyarylene alkanes with other dihydroxy compounds of the type mentioned above can be reacted with derivatives of the carbonic acid selected from the group consisting of carbonic diesters, especially diarylesters, phosgene and bis-chlorocarbonic acid esters of dihydroxy compounds.

Thus the mixtures of the dihydroxy compounds can be reesterified with carbonic acid diesters, e.g. with the dimethyl-, diethyl-, dipropyl-, dibutyl-, diamyl-, dioctyl-, dicyclohexyl-, and especially with the diphenyl- and di-o, m, or p-toluyl carbonate, or with mixed esters, for instance with the methyl-ethyl, the methyl-propyl, the ethyl-propyl, the methyl-cyclohexyl, the ethyl-cyclohexyl, the propyl-cyclohexyl, the methyl-phenyl, the ethyl-phenyl, the propyl-phenyl, the ethyl-o-, m-, or p-toluyl and the cyclohexyl-phenyl carbonate particularly at elevated temperatures from about 50–330° C. and especially from about 120 to about 290° C. and under reduced pressure for instance up to 0.1 mm. mercury gauge.

By re-esterifying the mentioned carbonic acid diesters, the corresponding alkyl or cycloalkyl alcohols or the corresponding phenols are split off.

The re-esterifying process has to be verified while excluding oxygen. We prefer to pass an inert-gas such as hydrogen, nitrogen, or carbon dioxide gas through the melt.

The re-esterification may be activated by re-esterifying catalysts, such as inorganic bases, for example caustic soda and potassium hydroxide, high boiling organic bases, such as acridine, metal hydrides, such as lithium and calcium hydride, alkali or alkaline earth metals, such as sodium, potassium, magnesium, and calcium, metal oxides, such as zinc oxide, aluminium oxide, lead oxide, antimonotrioxide, cerium oxide, and boron oxide, acids, such as phosphoric acid and p-toluene sulphonic acid, and salts, such as sodium benzoate, calcium acetate, and boron phosphate, and alcoholates and phenolates.

The polycarbonates can also be produced by introducing phosgene into solutions of mixtures of the aforesaid dihydroxy compounds in organic bases, such as dimethylaniline, diethylaniline, trimethylamine, and pyridine, or in indifferent organic solvents, such as petrol, ligroin, cyclohexane, methylcyclohexane, benzene, toluene, xylene, chloroform, methylenechloride, carbon tetrachloride, trichloroethylene, di-chloroethane, methylacetate, and ethylacetate, with addition of an acid-binding agent, e.g. tertiary amines.

A process particularly suitable for producing polycarbonates consists in introducing phosgene into the aqueous solution or suspension of alkali or alkaline earth metal salts, such as lithium, sodium, potassium, and calcium salts of the dihydroxy compounds, preferably in the presence of an excess of a base, such as lithium, sodium, potassium, and calcium hydroxide or carbonate. The polycarbonate then precipitates out from the aqueous solution.

The conversion in the aqueous solution is promoted by the addition of reaction inert solvents of the kind mentioned above which are capable of dissolving phosgene and eventually the produced polycarbonate.

The phosgene may be used in an equivalent amount. Generally, however, it is preferable to use an excess of the phosgene. Suitable temperatures are from about 0° C. to about 100° C.

Finally it is also possible to react bis-chloro-carbonates of di-monohydroxyarylene alkanes, optionally mixed with such of the aforementioned other dihydroxy compounds, with the aforementioned dihydroxy compounds, optionally also with mixtures of such dihydroxy compounds and with di-monohydroxyarylene alkanes. The condensation proceeds suitably in the presence of inert solvents, and acid-binding materials, e.g. tertiary amines.

When using phosgene or bis-chlorocarbonic acid esters as derivatives of the carbonic acid in producing polycarbonates according to the invention catalysts also may be advantageous. Such catalysts are for instance tertiary or quaternary organic bases or salts thereof, such as trimethylamine, triethylamine, dimethylaniline, diethylaniline, dimethylcyclohexylamine, and pyridine, or for instance the corresponding hydrochlorides, and tetramethylammoniumhydroxide, triethyloctadecylammoniumchloride, trimethyl-benzylammoniumfluoride, triethyl-benzylammoniumchloride, dimethyldodecylammoniumchloride, dimethylbenzylphenylammoniumchloride, trimethylcyclohexylammoniumbromide, and N-methylpyridiniumchloride, in amounts from about 0.05 to about 5 percent by weight. These compounds may be added to the reaction mixture before or during the reaction.

Further in some of these cases we prefer to add surface active agents, such as alkali metal salts of higher fatty acids or of sulphonic acids of higher aliphatic or of aromatic hydrocarbons and polyoxyethylated alcohols and phenols. Greater amounts of the quaternary ammonium bases mentioned above, too, act as such surface active agents.

In the production of polycarbonates according to the various processes it further is advantageous to employ small amounts of reducing agents, for example sodium or potassium sulphide, sulphite, and dithionite, or free phenol and p-tert.butyl-phenol.

By adding monofunctional compounds which are capable of reacting with phosgene or with the endgroups of the polycarbonates consisting of the chlorocarbonic acid ester group and which terminate the chains, such as the phenols, for instance, the phenol, the tert.butylphenol, the cyclohexylphenol, and 2,2-(4,4-hydroxyphenylene-4'-methoxyphenylene)-propane further aniline and methylaniline, it is possible to regulate the molecular weight of the polycarbonates in wide limits.

The following examples are given for the purpose of illustrating the invention, the parts being by weight.

*Example 1*

A solution of 7.8 parts of ethylene glycol (1 mol) in 25 parts by volume of absolute pyridine and 30 parts by volume of benzene are dropped with stirring at 0° C. within 30 minutes into a solution of 44.2 parts of 2,2-bis- (4,4'-phenylene-chlorocarbonate)-propane (1 mol) in 85 parts by volume of absolute benzene. After 20 hours standing at room temperature the mixture is decanted with water and the benzene solution washed first with dilute hydrochloric acid and then with water and dried over sodium sulphate. After evaporation of the benzene a clear colorless resin remains having a softening range of 196–200° C. and soluble, e.g. in ether, dioxane, acetone, cyclohexanone, acetic ester and methylene chloride. In view of the good solubility in esters and acetone, the product is suitable for lacquers. It forms hard elastic films of good strength.

Example 2

A solution of 11.6 parts of 2,2-(4,4'dihydroxydicyclohexylene)-propane (0.98 mol) in 130 parts by volume of absolute benzene and 12 parts of pyridine are dropped into a solution of 17.65 parts of 2,2-bis-(4,4'-phenylene-chlorocarbonate)-propane (1 mol) in 130 parts by volume of absolute benzene with stirring at 0° C. within 30 minutes. After 20 hours standing at room temperature the mixture is further treated as in Example 1. After evaporation of the benzene solution, a clear colorless resin remains having a softening range of 255–257° C. and soluble, e.g. in dioxane, tetrahydrofurane, acetone, cyclohexanone, toluene, acetic ester and methylene chloride. Because of its high softening point and very small tendency to crystallize the product is suitable for injection mouldings which are subjected to heat.

Moulded bodies possess high hardness, elasticity and strength together with small water absorption and excellent elastic properties.

Example 3

Into a solution of
110.1 parts of 2,2-(4,4'-dihydroxydiphenylene)-propane (0.8 mol)
13.3 parts of hydroquinone (0.2 mol)
0.12 parts of sodium dithionite
70.5 parts of sodium hydroxide (2.9 mol)
700 parts of water, and
600 parts of methylene chloride, there are introduced with stirring under a nitrogen atmosphere at 25° C. and within 2 hours, 71.5 parts of phosgene (1.2 mol). After adding 3 parts of triethylbenzyl ammonium chloride the organic solution runs together after an hour to a viscous mass which after diluting with methylene chloride, is washed with water, dilute hydrochloric acid and again with water. After evaporation of the methylene chloride a colorless clear resin remains. It has a softening range of 238–245° C. and is soluble, e.g. in cyclohexanone, dichloroethane, methylene chloride, and dimethylformamide.

Example 4

Into a mixture of
68.8 parts of 2,2 - (4,4'-dihydroxydiphenylene)-propane (0.6 mol)
56.1 parts of 4,4'-dihydroxydiphenyl (0.4 mol)
0.12 parts of sodium dithionite
70.4 parts of sodium hydroxide (2.9 mol)
700 parts of water, and
600 parts of methylene chloride, there are introduced with stirring under a nitrogen atmosphere at 25° C. within 2 hours, 71.5 parts of phosgene (1.2 mol). After adding 3 parts of triethylbenzyl ammonium chloride, the organic solution runs together in an hour to a viscous mass. It is washed in a kneading machine with water, dilute sulphuric acid and again with water, ground up and dried in vacuum. The dried crystalline granulate has a softening range of 265–270° C. and is soluble in dioxane, tetrahydrofurane, methylene chloride and dimethylformamide.

Example 5

Into a mixture of
123.8 parts of 2,2-(4,4'-dihydroxydiphenylene)-propane (0.9 mol)
9.7 parts of 2,6-dihydroxynaphthalene (0.1 mol)
0.12 parts of sodium dithionite
70.5 parts of sodium hydroxide (2.9 mol)
700 parts of water, and
600 parts of methylene chloride, there are introduced with stirring under a nitrogen atmosphere at 25° C. within 2 hours, 71.5 parts of phosgene (1.2 mol). After adding 3 parts of triethylbenzyl ammonium chloride, the organic solution becomes highly viscous within an hour. After dilution with methylene chloride it is washed with water, dilute hydrochloric acid and again with water, dried over sodium sulphate and evaporated in vacuum. A colorless resin remains with a softening point of 290° C. and which is soluble in dioxane, cyclohexanone, dichloroethane, and methylene chloride. Films, cast from methylene chloride solution, show very good mechanical strength and are suitable because of their high softening point especially for films subjected to heat.

Example 6

Into a mixture of
110.1 parts of 2,2-(4,4'-dihydroxydiphenylene)-propane (0.8 mol)
19.3 parts of 2,6-dihydroxynaphthalene (0.2 mol)
0.12 parts of sodium dithionite
70.5 parts of sodium hydroxide (2.9 mol)
700 parts of water, and
600 parts of methylene chloride, there are introduced with stirring in a nitrogen atmosphere at 25° C. within 2 hours, 71.5 parts of phosgene (1.2 mol). After adding 3 parts of triethylbenzyl ammonium chloride the organic solution becomes highly viscous after about 30 minutes. It is washed in a kneading machine with water, dilute sulphuric acid and again with water, ground up and dried in vacuum. The granulate has a softening point of 300° C. and is soluble e.g. in dioxane, tetrahydrofurane, cyclohexanone, toluene, dichloroethane, and methylene chloride. Films cast from methylene chloride solution show very good mechanical strength and because of their high softening point are especially suitable for films subjected to heat.

Example 7

12 parts of absolute pyridine are dropped into a solution of 17.7 parts of 2,2-bis-(4,4'-phenylene-chlorocarbonate)-propane (0.05 mol) and 6.9 parts of p-xylylene glycol in 200 parts of methylene chloride, with stirring at 5° C. within 45 minutes. After 20 hours standing at room temperature the mixture is shaken with water then with dilute hydrochloric acid and again with water and dried over sodium sulphate. After evaporating there is obtained a colorless resin whose softening range lies at 200–210° C. and which is soluble in benzene, toluene, chloroform, methylene chloride and cyclohexanone. Films cast from solutions attain especially high strength values.

Example 8

Into a mixture of
91.2 parts of 2,2-(4,4'-dihydroxydiphenylene)-propane 0.4 mol)
11 parts resorcinol (0.1 mol)
82 parts of sodium hydroxide (2.05 mol)
900 parts of water, and
200 parts of methylene chloride, there are introduced with stirring under a nitrogen atmosphere at 25° C. in 2 hours, 74 parts of phosgene (0.75 mol). After addition of 2 parts of triethylbenzyl ammonium chloride a viscous mass forms in the course of an hour. This is washed in a kneading machine, first with water then with dilute hydrochloric acid and finally again with water, ground up and dried in vacuum. A colorless elastic resin is obtained, soluble in benzene, toluene, methylene chloride, chloroform and cyclohexanone, with a softening range of 230–250° C. As a consequence of its small tendency to crystallise, it is especially suitable for thermoplastic mouldings and the production of films.

*Example 9*

74 parts of phosgene (0.75 mol) are introduced with stirring under a nitrogen atmosphere at 20° C. within 2 hours into a mixture of 91.2 parts of 2,2-(4,4'-dihydroxydiphenylene)-propane (0.4 mol), 16 parts of 1,6-dihydroxynaphthalene (0.1 mol), 82 parts of sodium hydroxide (2.05 mol), 900 parts of water and 200 parts of methylene chloride. After adding 2 parts of triethylbenzyl ammonium chloride a viscous mass is formed in the course of 1 to 2 hours. As described in Example 8 it is worked up to produce a colorless elastic resin soluble e.g. in benzene, toluene, methylene chloride, chloroform and cyclohexanone with a softening range of 240–260° C. Because of its small tendency to crystallise, it is suitable for thermoplastic forming and the production of films.

*Example 10*

74 parts of phosgene (0.75 mol) are introduced with stirring under a nitrogen atmosphere at 25° C. within 2 hours into a mixture of 57 parts of 2,2-(4,4'-dihydroxydiphenylene)-propane (0.25 mol), 29.5 parts of hexanediol-1,6 (0.25 mol), 82 parts of sodium hydroxide (2.05 mol), 900 parts of water and 200 parts of methylene chloride. After adding 2 parts of triethylbenzyl ammonium chloride a viscous mass is formed in one to two hours. It is worked up as described in Example 8. The colorless elastic resin is obtained, soluble, e.g. in benzene, toluene, methylene chloride, chloroform and cyclohexanone, with a softening range of 220–240° C. It is suitable for the production of films from the melt or from solutions.

*Example 11*

A mixture of 32 hours of 2,2-(4,4'-dihydroxy-diphenylene)-propane, 7.1 parts of hexanediol-1,6, 45 parts of diphenylcarbonate, and 0.08 parts of the sodium salt of 2,2-(4,4'-dihydroxy-diphenlene)-propane are melted together under nitrogen. Most of the phenol split off is distilled off within half an hour at 170° C. and 60 mm. mercury gauge. Heating is maintained at 15 mm. mercury gauge for a further 15 minutes at 170° C., for 15 minutes at 200° C., the pressure then reduced to 0.2 mm. mercury gauge and there is finally obtained after two hours at 250° C. a clear transparent colorless resin with a softening range of 180–210° C., soluble, e.g. in methylene chloride, chloroform, and toluene. The product may be worked up from solutions or from the melt into shaped bodies such as films, and fibres which can be orientated by stretching.

*Example 12*

A mixture of 517 parts of 2,2-(4,4'-dihydroxy-diphenylene)-propane, 34.5 parts of hydroquinone, 675 parts of diphenylcarbonate, 0.08 parts of the sodium salt of 2,2-(4,4'-dihydroxy-diphenylene)-propane are melted together under a nitrogen atmosphere. Most of the separated phenol is distilled off for an hour at 160–200° C. under a pressure of 50–15 mms. mercury gauge. Heating is continued for further half an hour to 200° C. under a pressure of 0.2 mms. mercury gauge, and for three hours at 270° C. The colorless clear resin obtained being soluble, e.g. in methylene chloride and chloroform possesses a softening range of 225–240° C. and may be worked up from solutions or from the melt of filaments, films and other shaped bodies.

We claim:

1. A linear film and fibre forming thermoplastic polycarbonate resin consisting essentially of a linear carbonic acid ester of organic dihydroxy compounds, from 50 to 90 mol percent of the organic dihydroxy compounds having the formula:

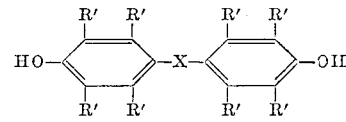

wherein X is selected from the group consisting of

and

each R being selected from the group consisting of hydrogen, unbranched and branched monovalent alkyl radicals having up to 10 carbon atoms, monovalent saturated cycloaliphatic radicals, monovalent aralkyl radicals having up to 4 carbon atoms as side-chains, phenyl, and furyl radicals, Z represents the carbon and hydrogen atoms completing a saturated cycloaliphatic ring, and each R' represents a member of the group consisting of hydrogen, monovalent unbranched and branched alkyl radicals having up to 5 carbon atoms, monovalent saturated cycloaliphatic radicals and aromatic hydrocarbon radicals, the remaining organic dihydroxy compounds being selected from the class consisting of saturated aliphatic glycols, xylylene glycols, dihydroxy cycloalkanes, dihydroxy benzenes, dihydroxy substituted aryl hydrocarbons having at least two benzene rings directly joined to each other, and hydroxy benzyl alcohols.

2. The polycarbonate resin of claim 1 in which said remaining dihydroxy compounds are dihydroxy benzenes.

3. The polycarbonate resin of claim 1 in which said remaining dihydroxy compounds are dihydroxy diphenyls.

4. The polycarbonate resin of claim 1 in which said remaining dihydroxy compounds are dihydroxy naphthalenes.

5. The polycarbonate resin of claim 1 in which said remaining dihydroxy compounds are alkanediols having up to 10 carbon atoms in the molecule.

6. A process for preparing a high molecular weight, resinous copolycarbonate which comprises reacting, under polycarbonate-forming conditions, phosgene with a mixture of (1) 2,2-bis-(4-hydroxyphenyl)-propane and (2) ethylene glycol.

References Cited in the file of this patent

UNITED STATES PATENTS

| | | |
|---|---|---|
| 2,069,573 | Bolton | Feb. 2, 1937 |
| 2,121,680 | Arvin | June 21, 1938 |
| 2,517,965 | Bohl | Aug. 8, 1950 |
| 2,595,343 | Drewitt et al. | May 6, 1952 |

FOREIGN PATENTS

| | | |
|---|---|---|
| 507,569 | Canada | Nov. 23, 1954 |
| 546,375 | Belgium | Mar. 23, 1956 |

UNITED STATES PATENT OFFICE
CERTIFICATE OF CORRECTION

Patent No. 3,136,741                           June 9, 1964

Hermann Schnell et al.

It is hereby certified that error appears in the above numbered patent requiring correction and that the said Letters Patent should read as corrected below.

Column 7, line 43, for "hours" read -- parts --.

Signed and sealed this 17th day of November 1964.

(SEAL)
Attest:

ERNEST W. SWIDER                        EDWARD J. BRENNER
Attesting Officer                          Commissioner of Patents